G. H. HODGE AND J. C. ROBINSON.
BAKER'S OVEN.
APPLICATION FILED NOV. 28, 1919.

1,337,909.

Patented Apr. 20, 1920.

Inventors
G. H. Hodge
J. C. Robinson

UNITED STATES PATENT OFFICE.

GEORGE HENRY HODGE AND JOSEPH CHARLTON ROBINSON, OF LONDON, ENGLAND.

BAKER'S OVEN.

1,337,909.

Specification of Letters Patent.

Patented Apr. 20, 1920.

Application filed November 28, 1919. Serial No. 341,264.

*To all whom it may concern:*

Be it known that we, GEORGE HENRY HODGE and JOSEPH CHARLTON ROBINSON, subjects of His Majesty the King of England, and residents of London, in the county of Middlesex and Kingdom of England, have invented certain new and useful Improvements in and Relating to Bakers' Ovens, of which the following is a specification.

Our invention relates to improvements in baking ovens of the drawplate type for baking bread and the like, and consists essentially of a drawplate oven heated by steam tubes or by hot air, and formed with any number of separate decks or baking compartments as required, a hinged flap door being provided for each deck to inclose the baking space, and an outer packed door to inclose the whole oven and in conjunction with the oven we provide an independent trolley formed with decks corresponding exactly with the deck levels in the oven. On each deck level of the trolley are guide rails, on which traverses a skeleton framed baking sole. This sole is actually the drawplate on which the baking trays are placed. At suitable intervals are angle bars for guiding and supporting the baking trays, the angle bars being arranged at convenient intervals to accommodate the particular product to be baked or to the method preferred of charging the soles. Continuous with the guide rails on the trolley are similar guide rails fixed on the inside plates of the oven, and on to these rails in the oven the skeleton framed baking soles are wheeled from the trolley into the oven. Or it may be preferred to mount the wheels on the sides of the oven and the trolley and to mount the guide rails on the skeleton framed baking soles. Formed on the fore part of the trolley at each deck level are horns, and when the trolley is moved up to the oven, these horns project against the flap doors, which they lift and sustain in the open position while the baking soles are being transferred from the trolley into the oven. When the baking practice is such that it is desirable to charge one or other of the compartments separately, the horns on the trolley may be omitted and the flap doors may be arranged to be opened by hand levers or any other convenient method.

According to our invention the method of its working is as follows:—The trolley being in a convenient place for charging and the baking soles in their respective positions on the trolley, the baking trays containing the goods to be baked are slid on to the angle bars of the baking soles, the outer doors of the oven are opened and the trolley is moved up to the front of the oven. The projecting horns open the flap doors, and the baking soles are propelled from the trolley into the oven—the propulsion of the baking soles may be effected by hand or by rollers or other convenient method. The trolley is then withdrawn and the flap doors automatically close. The outer doors are closed by hand. When the baking process is completed the trolley is wheeled up to the oven again and the baking soles are withdrawn from the oven on to the trolley and run to a convenient place to be discharged.

Our invention will be readily understood by reference to the accompanying drawings, in which:—

Figure 1:
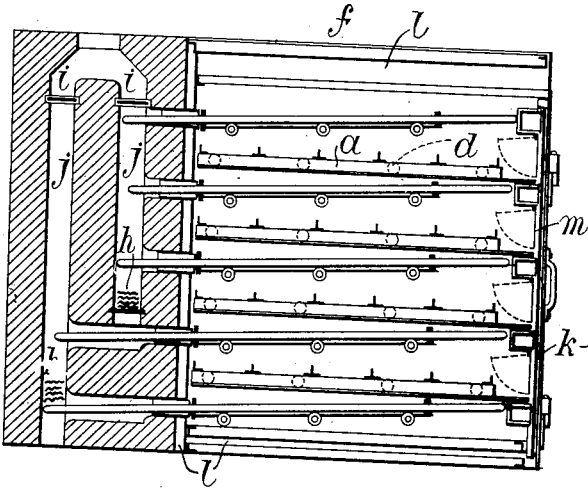
Figure 1 is a vertical section of the oven.
Figure 2:
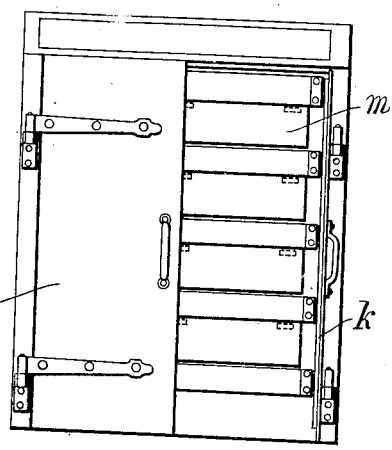
Fig. 2 is a front elevation with one of the outer doors shown open.
Figure 3:
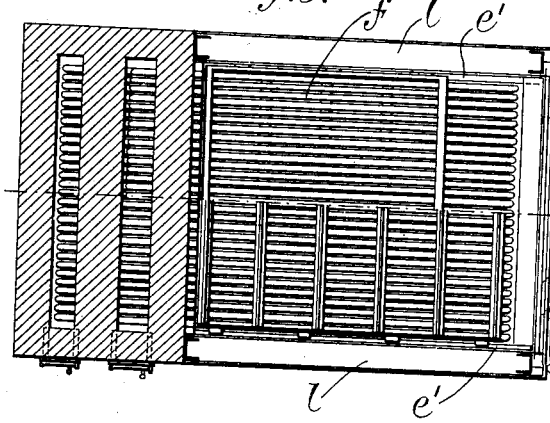
Fig. 3 is a horizontal sectional plan showing on one half the baking sole, and on the other half the steam heating tubes.
Figure 4:
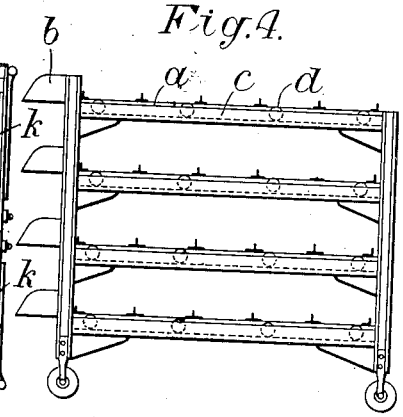
Fig. 4 is a side elevation of the trolley.

The reference letters indicate:—$a$, the skeleton framed baking sole or drawplate. $b$, the horns. $c$, the runners or guide rails. $d$, the baking sole wheels. $e^1$, the runners, or guide rails in the oven. $f$, the steam heating tubes. $h$, the fires. $i$, the dampers. $j$, the flues. $k$, the outer doors. $l$, space surrounding the oven, packed with non-conducting material, and $m$, the flap doors.

What we claim as new and desire to secure by Letters Patent of the United States is:—

1. An oven having a plurality of separate deck compartments, a closure for the whole, and a separate closure for each compartment.

2. An oven having a plurality of separate deck compartments, a closure for the whole, and a separate flap door for each compartment.

3. An oven having a plurality of separate deck compartments, a closure for the whole, a separate closure for each compartment, a coöperating trolley with a plurality of decks, and means on said trolley for opening the separate door closures on the oven.

4. An oven having a plurality of separate deck compartments, a closure for the whole, a separate flap door for each compartment, a coöperating trolley with a plurality of decks, and projecting horns on the trolley for lifting the flap doors on the oven.

5. An oven having a plurality of separate deck compartments, a closure for the whole, a separate flap door for each compartment, a coöperating trolley with a plurality of decks, said decks being adapted to accommodate wheeled baking soles, and projecting horns for lifting the flap doors on the oven.

In testimony whereof we have hereunto signed our names.

GEORGE HENRY HODGE.
JOSEPH CHARLTON ROBINSON.